(12) United States Patent
Toyoda et al.

(10) Patent No.: US 7,978,904 B2
(45) Date of Patent: Jul. 12, 2011

(54) PATTERN INSPECTION APPARATUS AND SEMICONDUCTOR INSPECTION SYSTEM

(75) Inventors: Yasutaka Toyoda, Hitachi (JP);
Takumichi Sutani, Hitachinaka (JP);
Ryoichi Matsuoka, Yotsukaido (JP);
Hidemitsu Naya, Hitachi (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1006 days.

(21) Appl. No.: 11/834,218

(22) Filed: Aug. 6, 2007

(65) Prior Publication Data

US 2008/0175469 A1 Jul. 24, 2008

(30) Foreign Application Priority Data

Aug. 14, 2006 (JP) ................................. 2006-220926

(51) Int. Cl.
*G06K 9/00* (2006.01)
*G06K 9/48* (2006.01)
(52) U.S. Cl. ......... 382/149; 382/145; 382/199; 430/313
(58) Field of Classification Search .......... 382/141–152, 382/199, 203, 209–233; 348/86–95, 125–134; 356/237.1–237.6; 430/269, 296, 311, 313, 430/966, 967, 325, 317; 345/581, 589, 600, 601, 602
See application file for complete search history.

(56) References Cited

U.S. PATENT DOCUMENTS 7,559,047 B2 * 7/2009 Miyamoto et al. .............. 716/21

FOREIGN PATENT DOCUMENTS

JP 2005-277395 A 10/2005
* cited by examiner

*Primary Examiner* — Sheela C Chawan
(74) *Attorney, Agent, or Firm* — Crowell & Moring LLP

(57) ABSTRACT

There is provided a pattern inspection apparatus that is capable of detecting a defect accurately and efficiently to inspect a pattern of a semiconductor device. The pattern inspection apparatus includes: a contour extraction means for extracting contour data of a pattern from a captured image of the semiconductor device; a non-linear part extraction means for extracting a non-linear part from the contour data; an angular part extraction means for extracting an angular part of a pattern from design data of the semiconductor device; and a defect detection section that compares a position of the non-linear part extracted by the non-linear part extraction section with a position of the angular part extracted by the angular part extraction section so as to detect a position of a defective part of a pattern.

15 Claims, 7 Drawing Sheets

(a)

(b)

(a)

(b)

(c)

(d)

(e)

(f)

PATTERN INSPECTION APPARATUS AND SEMICONDUCTOR INSPECTION SYSTEM

BACKGROUND OF THE INVENTION

1. Field of the Invention

The present invention relates to a pattern inspection apparatus that inspects a pattern formed on a wafer by using an image of a semiconductor device and design data of the semiconductor device. The present invention also relates to a semiconductor inspection system composed of an electron microscope and a computer that operates as the pattern inspection apparatus.

2. Description of the Related Art

In semiconductor devices in recent years, miniaturization and multilayering have been advanced and the logic has become complicated, causing extreme difficulties in the manufacture thereof. As a result, defects attributable to the manufacture process tend to occur frequently, and it is accordingly important to detect the defects efficiently and correctly and to specify a problem of the manufacture process.

The defects attributable to the manufacture process include deformation, cutting, short-circuit of the pattern and the like, and these defects can be detected by comparing a manufactured pattern with a reference pattern having an ideal shape. More specifically, an operator selects a pattern having an ideal shape from patterns formed on a wafer, and the selected pattern is captured and imaged to form a reference image in advance. Then, a pattern to be inspected is captured, and the positions of the image of the pattern to be inspected and that of the reference image are adjusted to each other. Thereafter, finite difference calculation of these two patterns is performed. When a defect is included in the pattern to be inspected, brightness information of a detective position is different from that of the reference image, so that a difference value between these two patterns increases. By use of this property, a position having a difference value equal to or more than a fixed value is detected as a defective position.

However, in the aforementioned conventional inspection method, a registration operation for a reference pattern must be performed by the operator, thus causing a problem where much time is required to inspect patterns of various shapes. For this reason, it has been attempted to automate the registration operation of a reference pattern and thereby to reduce inspection time, by using design data such as CAD (Computer Aided Design) of the semiconductor device as the reference pattern.

Japanese Patent Application Laid-Open Publication No. 2005-277395 (JP-A No. 2005-277395) discloses a method for detecting cutting or short-circuit in a pattern in the following way. Precisely, firstly, an area where the cutting or short-circuit in the pattern is likely to occur is specified from design data. Then, an image area corresponding to the aforementioned area is decided using a result from the positioning of both the design data and a captured image of a circuit pattern. After that, the presence or absence of an edge and its state in the circuit pattern existing in the image area are inspected to detect the cutting or short-circuit of the pattern.

SUMMARY OF THE INVENTION

However, the shape of design data such as CAD data and the like is what is termed as an extremely ideal shape. For example, an angular part of the circuit pattern such as a line end and a corner is a shape that cannot be reproduced in the current manufacture process. Accordingly, there is a problem that even a part having no defect in view of an electrical characteristic may be detected as a defect by using the conventional method in which difference values are simply obtained from the design data and the shape of the pattern to be inspected, and in which then a position having a difference value equal to or more than a fixed value is detected as a defective position. Furthermore, there is difficulty in distinguishing such a defective part of the circuit pattern by using the differential information.

Even with the method disclosed in JP-A No. 2005-277395, erroneous detection of defects may probably occur in a case where the positioning of both design data and the image is not precisely performed, a case where the actual pattern largely expands or contracts as compared with the pattern of design data, and a case where an unintended pattern is included in an image area estimated from design data.

JP-A No. 2005-277395 also discloses a method for detecting a defect of a circuit pattern on a wafer by comparing a reference pattern with an edge of the circuit pattern. Specifically, the reference pattern is obtained by converting design data to a shape appropriate for comparison with the circuit pattern, and the edge of the circuit pattern is extracted from a captured image of the circuit pattern. However, the shape appropriate for comparison with the circuit pattern is sometimes unclear before inspection and erroneous detection of defects may occur due to an error in comparison between the reference pattern and the circuit pattern on the wafer.

In view of the aforementioned circumstances, it is an object of the present invention to provide a pattern inspection apparatus which solves the problems of the conventional techniques, and which is capable of detecting a defect accurately and efficiently. Moreover, the present invention also provides a semiconductor inspection system using such a pattern inspection apparatus.

In order to solve the aforementioned problem, a pattern inspection apparatus of the present invention includes a contour extraction section that extracts contour data of a pattern from a captured image of the semiconductor device; a non-linear part extraction section that extracts a non-linear part from the contour data; an angular part extraction section that extracts an angular part of a pattern from design data of the semiconductor device; and a defect detection section that compares a position of the non-linear part extracted by the non-linear part extraction section with a position of the angular part extracted by the angular part extraction section so as to detect a position of a defective part of a pattern.

Preferably, the defect detection section determines a non-linear part having no positionally corresponding angular part and an angular part having no positionally corresponding non-linear part as defective parts.

Preferably, the defect detection section detects a direction of a pattern from a convex direction of the non-linear part and detects a direction of a pattern from an angular direction of the angular part and compares a position of the non-linear part with a position of the angular part, and compares the direction of the pattern detected from the non-linear part with the direction of the pattern detected from the angular part so as to detect a defective position of the pattern.

Preferably, the defect detection section determines a non-linear part, having no positionally corresponding angular part, and an angular part, having no positionally corresponding non-linear part, as defective parts, and determines a non-linear part and an angular part, positionally corresponding to each other but being different from each other in the detected direction of the pattern, as defective parts Preferably, the pattern inspection apparatus of the present invention further includes a data storage section that stores data of the non-linear part extracted by the non-linear part extraction section and data of a linear part, where the non-linear part is excluded from the contour data, in a distinguishable format, wherein the defect detection section detects a defective position of a pattern using data of the non-linear part stored in the data storage section.

Preferably, the pattern inspection apparatus of the present invention further includes an inspection section that inspects a pattern width and a pattern length of a linear pattern using data of the linear part stored in the data storage section.

Preferably, the pattern inspection apparatus of the present invention further includes a display section that displays a captured image of the semiconductor device to be inspected, design data, and position information of a defective part.

According to the present invention, it is possible to provide a pattern inspection apparatus capable of detecting defects accurately and efficiently in a pattern of a semiconductor device by comparing a non-linear part of a captured image with an angular part of design data.

DESCRIPTION OF THE PREFERRED EMBODIMENTS

Figure 4:
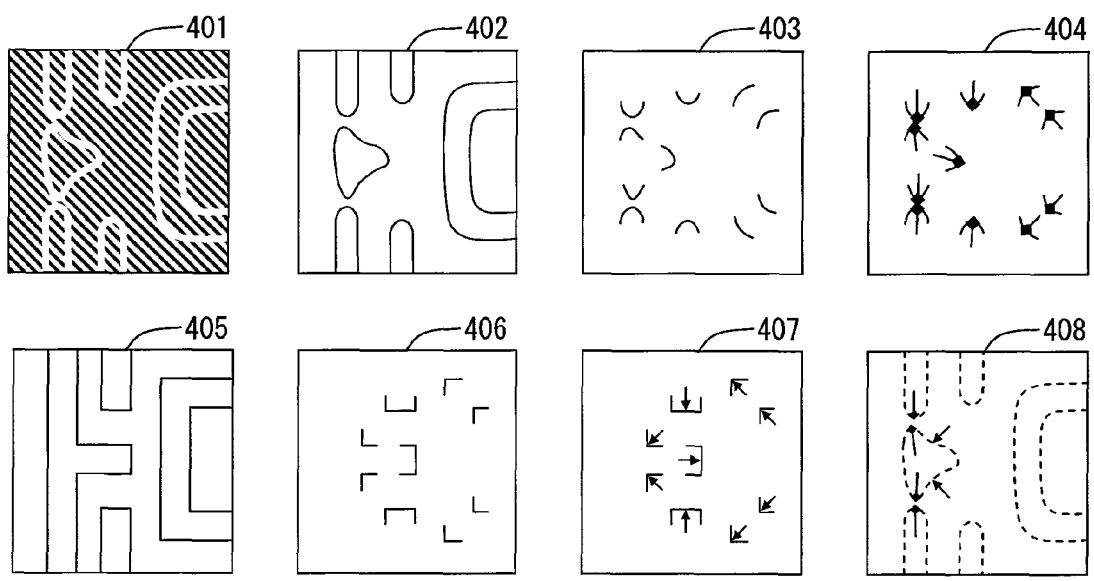
FIG. 4 is a view showing the process of defect detection.

In the present invention, as shown in FIG. 4, a captured image 401 of a circuit pattern and design data 405 of the circuit pattern are compared with each other to detect a defective part 408 of the circuit pattern included in the image 401. The present invention uses the fact in which detective parts of a pattern such as cutting, short-circuit and distortion of the pattern, and adhesion of foreign material are formed as a non-linear pattern in the same manner as an angular part such as a line end and a corner of the pattern. In the present invention, a non-linear part 403 of the circuit pattern is detected from the captured image 401 of the circuit pattern, and an angular part 406 of the pattern such as a line end and a corner is detected from design data 405. Then, the presence or absence of corresponding points between the non-linear part 403 extracted from the image 401 and the angular part 406 extracted from the design data 405 is inspected, thereby detecting the defective part 408 such as cutting, short-circuit and distortion of the pattern, and adhesion of foreign material. The following will explain the content of the present invention with reference to the drawings.

An explanation will be given of a pattern inspection apparatus of the present invention that detects a defective part by using an image in which a circuit pattern on a wafer is captured and design data.

Figure 1:
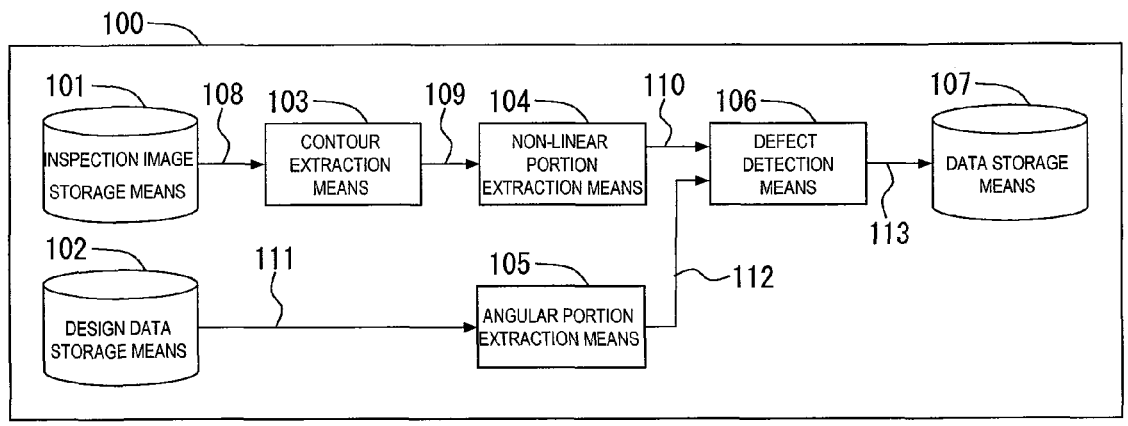
FIG. 1 is a block diagram showing a configuration of a pattern inspection apparatus according to a first embodiment of the present invention.

FIG. 1 is a block diagram showing a configuration of a pattern inspection apparatus according to one embodiment of the present invention. A pattern inspection apparatus 100 includes: an image data storage section 101 that stores an image 108 in which a circuit pattern to be inspected is captured; a design data storage section 102 that stores design data 111 corresponding to a circuit pattern included in the image 108; a contour extraction section 103 that extracts contour data 109 of the circuit pattern from the image 108; a non-linear part extraction section 104 that extracts information 110 of a non-linear part from the contour data 109; an angular part extraction section 105 that extracts information 112 of an angular part such as a line end and a corner from the design data 111; a defect detection section 106 that detects information 113 of a defect of the circuit pattern included in the image 108 from the information 110 of the non-linear part and the information 112 of the angular part; and a defective data storage section 107 that stores information 113 of the detected defect.

The pattern inspection apparatus 100 can be implemented by use of a computer 200 of a semiconductor inspection system 210 shown in FIG. 2A and a computer 205 shown in FIG. 2B. More precisely, the computer 200 is composed of a data storage section such as a memory and a hard disk, and a data calculation device such as a CPU and a hardware accelerator. Meanwhile, the computer 205 is capable of receiving and providing data from and to the semiconductor inspection system 210 via a network line such as a local area network 206 and a storage device such as a hard disk and a compact disk.

An explanation will be given of configuration elements of the semiconductor inspection system 210 with reference to FIG. 2A. The semiconductor inspection system 210 includes a SEM (Scanning Electron Microscope) 201 that captures an image of a circuit pattern on a wafer and a computer 200 that controls the SEM 201. The computer 200 is an information processing apparatus typified by a personal computer and a workstation, and includes a data calculation section 203 that executes control of the SEM 201 and a pattern inspection of the present invention, a data input section 204 that inputs information for controlling the data calculation section 203, and a data display section 202 that displays a captured image of the SEM 201 and information of an inspection result and the like.

The data calculation section 203 includes a memory that stores the design data 111, the image 108 of the semiconductor device captured by the SEM 201, a control program of the SEM 201, a software program that defines each processing section of the pattern inspection apparatus 100, etc., a CPU that executes these programs, a signal input interface for inputting the design data 111 and the image 108 to the data calculation section 203, and a signal output interference for outputting information 113 of the detected defect, the design data 111, the image 108, etc., onto the data display section 202. The data input section 204 is an information input device such as a keyboard and a mouse, and the data display section 202 is an information display device such as a CRT and a liquid crystal display.

In addition, the signal input interface and the signal output interface are interfaces such as USB, IEEE 1394, Centronics, memory card, PCI and Ethernet, and the memory is a data storage device such as SDRAM, SRAM, DRAM, ROM, memory card and hard disk.

The following will explain each configuration element of the pattern inspection apparatus 100 with reference to FIG. 1. The contour extraction section 103 extracts contour data 109 of the circuit pattern from the image 108 in which the circuit pattern is captured. More specifically, an image filter such as a differential filter and a secondary differential filter is applied to the image 401 as shown in FIG. 4 to generate an image in which a circuit pattern is emphasized. Then, the generated image is subjected to binarization and thinning processing to extract contour data 402 of the circuit pattern.

Figure 6:
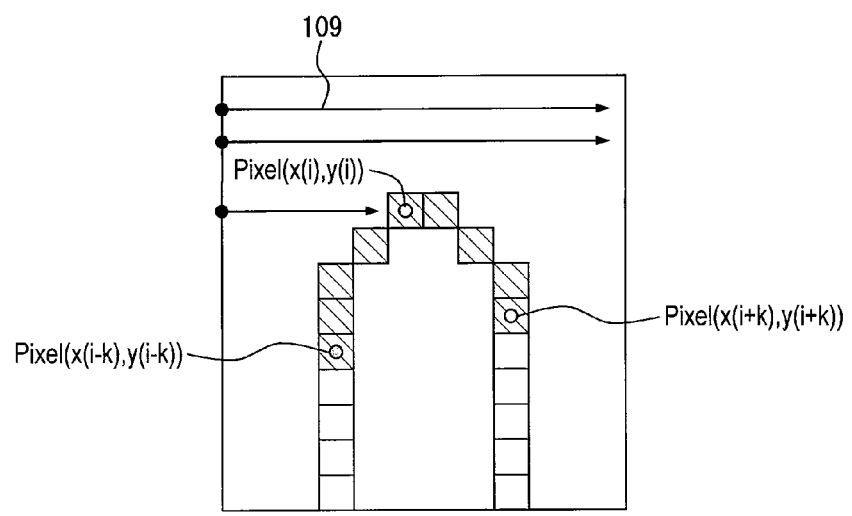
FIG. 6 is a view showing a procedure for detecting a non-linear part of a pattern from contour data.

The non-linear part extraction section 104 extracts, from the contour data 109, a corner part and a rounded part of the pattern, namely, coordinate information 110 of non-linear parts of the pattern. Although various methods can be used for extracting the non-linear part of the pattern, this example explains a method in which pattern curvature is obtained from contour data of a bit map as shown in FIG. 6 to extract a non-linear part of the pattern.

First, an image is scanned from an upper left of the contour data 109 to detect a pixel position, Pixel (x(i), y(i)), that forms the contour. Then, a sequence of points of contour data, Pixel (x(i−k), y(i−k)) to Pixel (x(i+k) y(i+k)) with center at the pixel position Pixel (x(i), y(i)), is obtained. After that, curvature P of the pixel position Pixel (x(i), y(i)) is obtained using equation 1.

[Equation 1]

$$p = \frac{dy^2/dx^2}{\{1+(dy/dx)^2\}^{3/2}} \quad \text{Equ. 1}$$

$$d_- = \frac{1}{k}\sum_{i=-k+1}^{0}\frac{y_{i-1}-y_i}{x_{i-1}-x_i}, \quad d_+ = \frac{1}{k}\sum_{i=0}^{k-1}\frac{y_i-y_{i+1}}{x_i-x_{i+1}},$$

$$d_{+/-} = \frac{1}{k}\sum_{i=-k-2}^{k/2}\frac{y_i-y_{i+1}}{x_i-x_{i+1}}, \quad \frac{d^2y}{dx^2} = d_+ - d_-, \quad \frac{dy}{dx} = d_{+/-}$$

In addition, k is adjusted, thereby making it possible to adjust a range of contour data where curvature is obtained.

Figure 5:
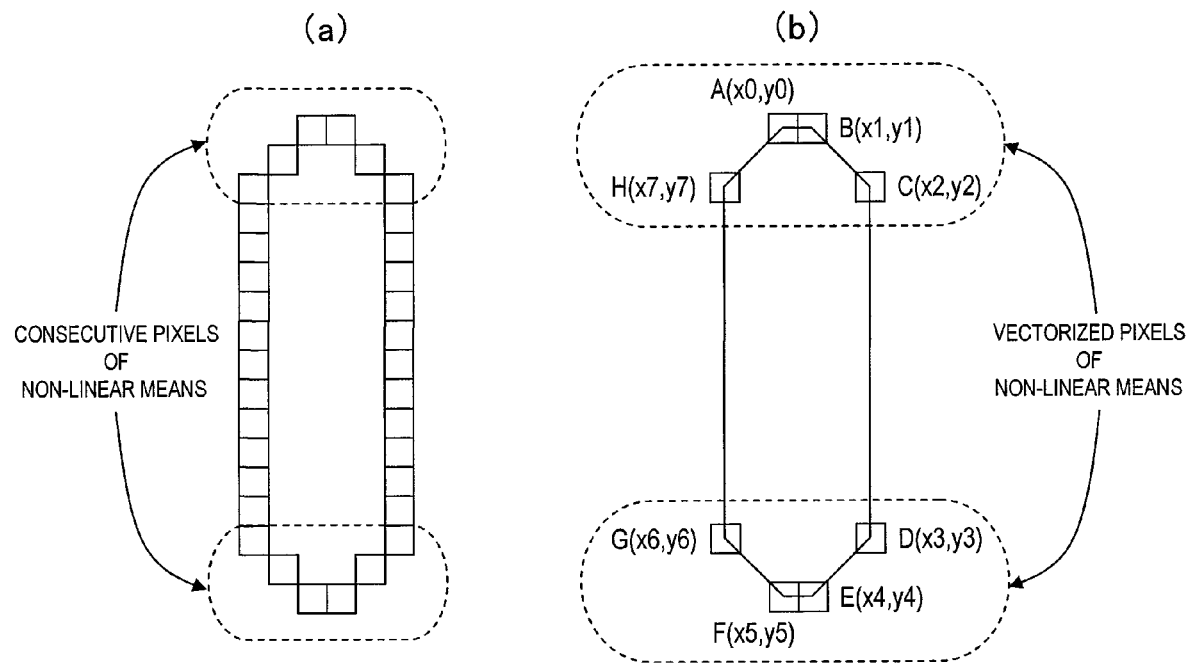
FIGS. 5A and 5B are views each showing contour data extracted from an image.

From the calculation result, coordinate information where a contour having a curvature value equal to or more than a fixed value is used as a non-linear part is obtained. In addition, the contour data 109 and the coordinate information 110 of the non-linear part can be expressed as coordinate information of consecutive pixels as shown in FIG. 5A. For this reason, linear approximation or the like is carried out to perform conversion to vector data composed of a vertex coordinate group that connects straight lines as shown in FIG. 5B, thereby allowing a reduction in an amount of the contour data 109 and that of the coordinate information 110 of the non-linear part.

Figure 7:
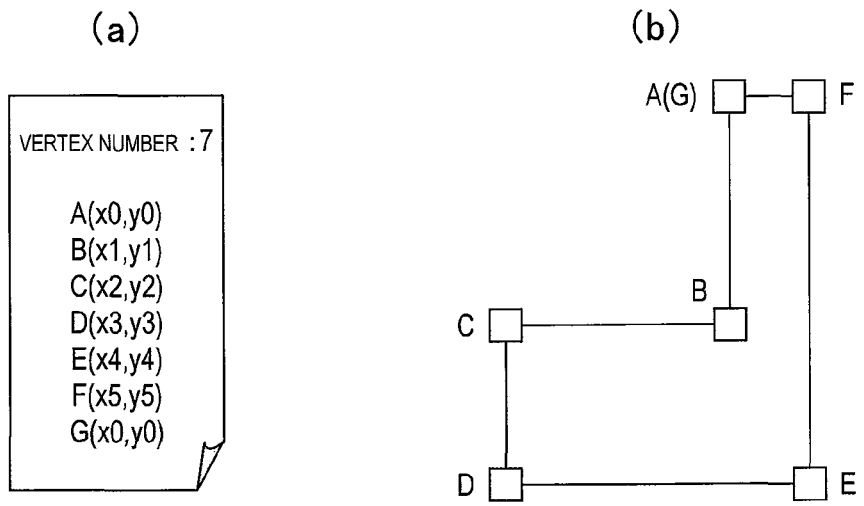
FIGS. 7A and 7B are views each showing a data format of design data.

The angular part extraction section 105 extracts coordinate information 112 of angular parts of the pattern such as a line end and a corner from the design data 111. Generally, the design data 111 is data in which vertex coordinates of the pattern are described, and a pattern as in FIG. 7B is described as a vertex coordinate group of a closed drawing as in FIG. 7A.

Coordinate information 407 such as a line end and a corner as shown in FIG. 4 is vertex coordinates of design data themselves and these vertex coordinates and coordinate information of a pattern in the vicinity thereof are extracted as coordinate information 112 of the angular part.

The defect detection section 106 compares coordinate information 110 of the non-linear part extracted from the image 108 with coordinate information 112 of the angular part extracted from the design data 111 so as to detect a defective part 113 in the image. A simple method is used in which the positions of the circuit pattern of design data 111 and that of the image 108 are adjusted to each other to detect corresponding points between the coordinate values 112 of the angular part of the design data 111 and the respective coordinate values 110 of the non-linear part extracted from the image 108. Thus, a part where no corresponding point exists is determined as a defective part.

Figure 3:
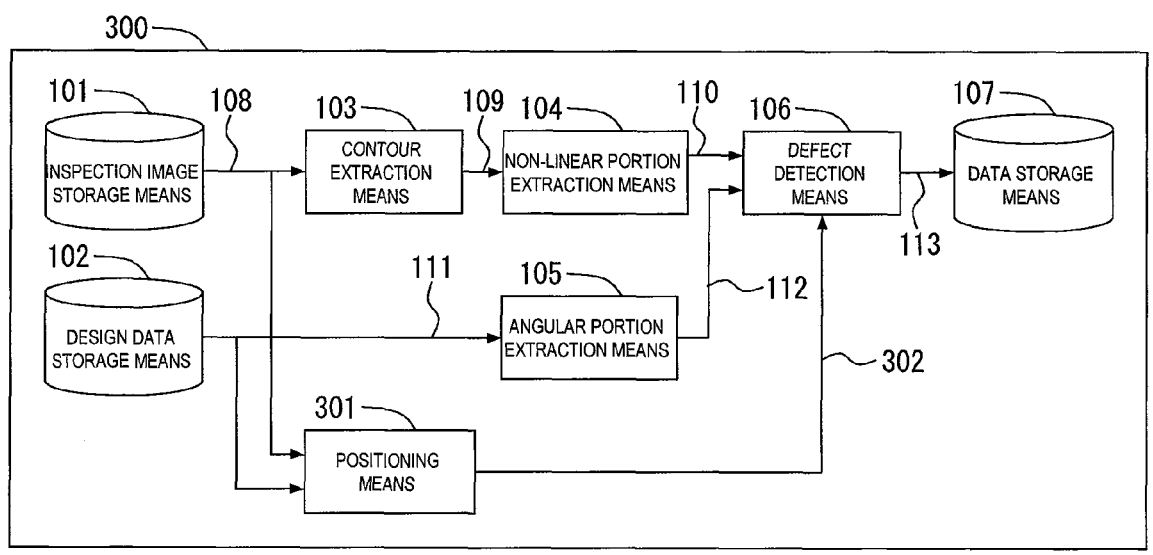
FIG. 3 is a block diagram showing a configuration of a pattern inspection apparatus of the present invention having a positioning section in the first embodiment.

In addition, the positioning of the circuit patterns can be automatically achieved by use of a positioning section 301 that detects adjustment reference positions 302 of the design data 111 and the image 108 as shown in a pattern inspection apparatus 300 in FIG. 3. It is possible to apply pattern matching processing such as a normalized correlation method and a Hough transform method to the positioning section 301.

Figure 14:
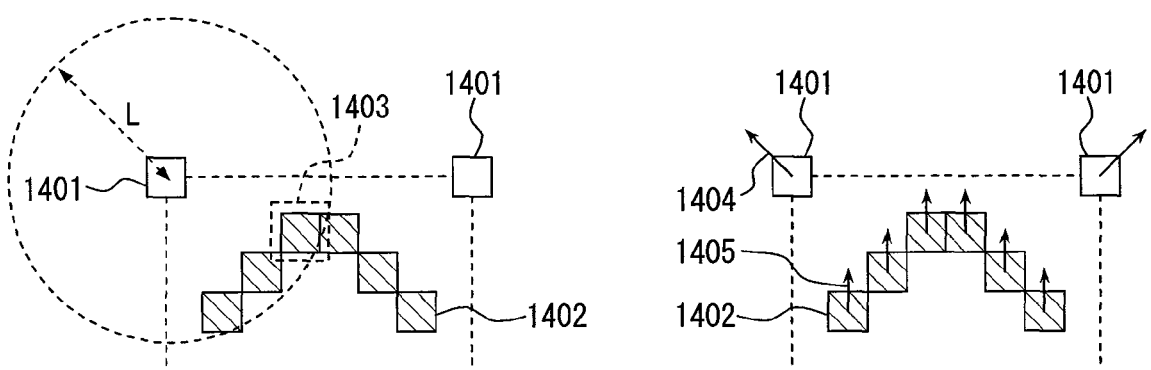
FIG. 14 is a view showing a relationship between an angular part of design data and a non-linear part of a circuit pattern.

FIG. 14 shows a specific example of the method for searching out the corresponding points. FIG. 14 is a view of a circuit pattern of a line end showing a positional relationship between an angular part 1401 extracted from the design data 111 and a non-linear part 1402 extracted from the image 108 after alignment. First, with respect to each point of the angular part 1401 of the design data 111, the presence or absence of the non-linear part 1402 existing within a fixed range L is detected. After the end of searching all corresponding points of the angular part 1401, with respect to each point of the non-linear part 1402 extracted from the image 108, the angular part 1401 existing in the fixed range L is searched in a similar manner. It is noted that L indicates an optional value.

Moreover, when the non-linear part 1402 extracted from the image 108 is composed of consecutive pixels as shown in FIG. 14, corresponding points with the angular part 1401 of design data 111 are searched with reference to the position of a central pixel 1403, thereby allowing a reduction in an amount of processing required for searching the corresponding points.

Furthermore, by use of a shape of the pattern in the vicinity of the angular part 112 extracted from the design data 111 and a shape of the contour data 109 in the vicinity of the non-linear part 110 extracted from the image 108, it is possible to perform a high-precision defect detection. More specifically, a direction 1405 of a pattern convex part is detected from the contour data 109 corresponding to the non-linear part 110 and a direction 1404 of an angular part is detected from vertex data of design data 111 corresponding to the angular part 112. The direction 1405 of the pattern of the non-linear part 110 can be easily obtained by referring to continuity of the contour data 109, and the direction 1404 of the angular part 112 of the design data 111 can be easily obtained based on the positional relationship of vertex coordinates. On searching the corresponding point, the searching target is limited to the angular part 112 or non-linear part 110 having a similar direction such as in a range of +/−45 degrees of the angular part and a range of +/−45 degrees of the non-linear part, thereby making it possible to prevent erroneous detection of the corresponding point.

Figure 8:
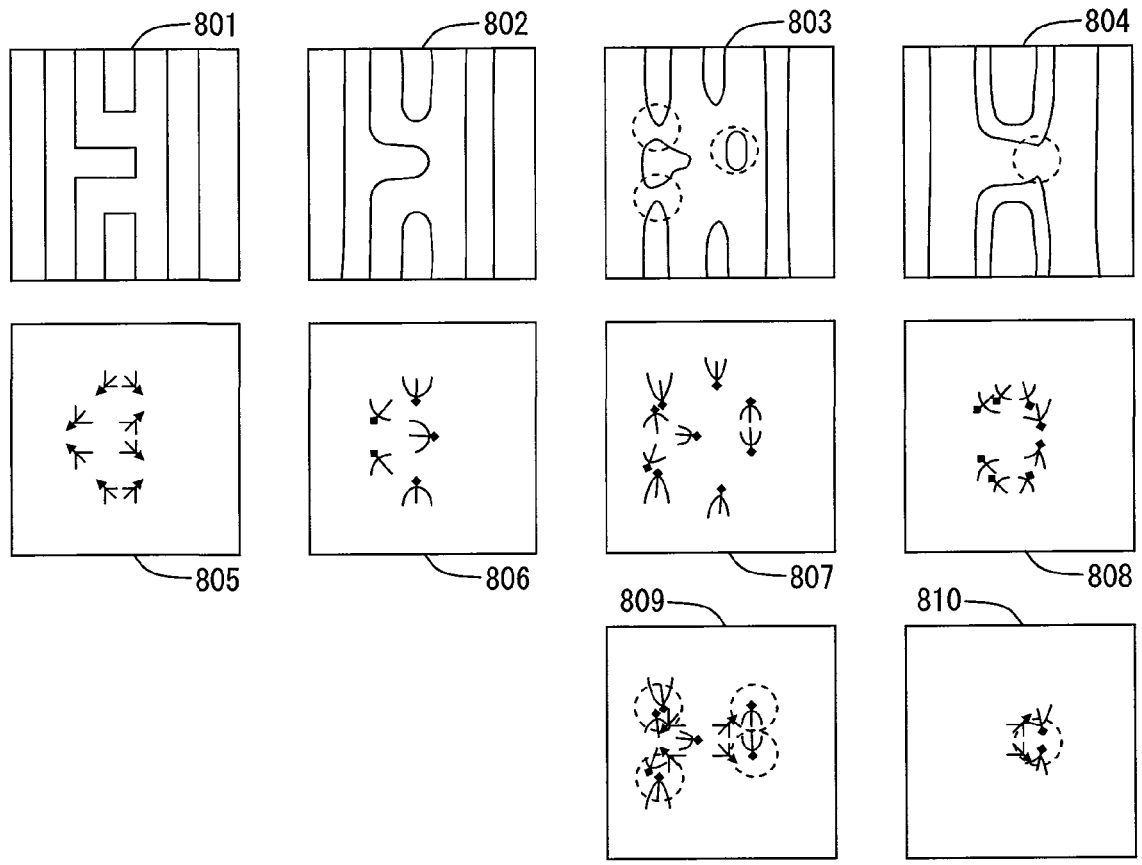
FIG. 8 is a view showing a process of detecting a plurality of defective information.

FIG. 8 shows an example of defect detection by the defect detection section 106. 801 denotes design data, and 802 to 804 denote images obtained by capturing a plurality of circuit patterns formed based on the design data 801. 802 denotes an image in which a normal pattern is captured, 803 denotes an image in which a cut pattern (shown in a broken line in the figure) is included, and 804 denotes an image in which a short-circuited pattern (shown in a broken line in the figure) is included. 805 shows an angular part extracted from design data 801 and a direction of the angular part, and each of 806 to 808 shows a non-linear part of contour data extracted from each of the images 802 to 804 and a direction of its convex part. The angular part 805 is compared with each of the non-linear parts 806 to 808 to thereby detect a defect. In comparison between the angular part 805 and the non-linear part 806, each corresponding point can be detected, and therefore no defect is detected. However, in comparison with the non-linear part 807, an angular part corresponding to the non-linear part (broken line in the figure) generated by the cutting of the pattern and adhesion of foreign material is not present in design data and therefore, as shown in 809, it is possible to detect the cut part of the pattern and the foreign material adhered part as defects Moreover, in connection with the example of the non-linear part 808, an angular part corresponding to the non-linear part (broken line in the figure) generated by the short-circuit part of the pattern is not present in design data, and therefore, as shown in 810, it is possible to detect the short-circuit part of the pattern as a defect. Furthermore, even though the corresponding points between these parts are present, if the distance between the corresponding points is large, the part indicated by the corresponding points may have a defect. In this case, such a defect is detected as a candidate and judgment may be left to an inspection operator.

Figure 11:
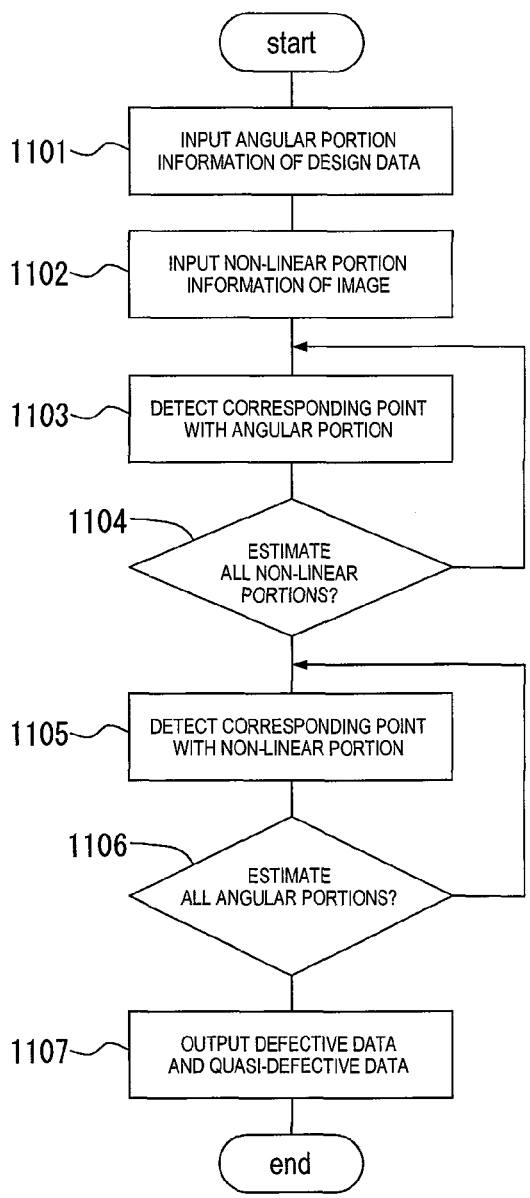
FIG. 11 is a flow chart explaining a defect detection procedure in a pattern inspection apparatus of the present invention.

FIG. 11 shows a flow chart explaining an operation of the defect detection section 106. First, in steps S1101 and S1102, coordinates 112 of the angular part of design data 111 and coordinate information 110 of the non-linear part extracted from contour data 109 of the image 108 are inputted. In steps S1103 and S1104, a reference point is detected from each part and a corresponding point with the angular part 112 is searched with respect to all non-linear parts 110. Then, in steps S1105 and S1106, a corresponding point of the non-linear part 110 is detected with respect to all angular parts 112. In step S1107, a point where no corresponding point is detected is regarded as a defective position 113, and when there is a large distance between the corresponding points, the angular part and the non-linear part are regarded as quasi-defective positions and the coordinate information and the contour data are outputted to the data storage section.

Figure 12:
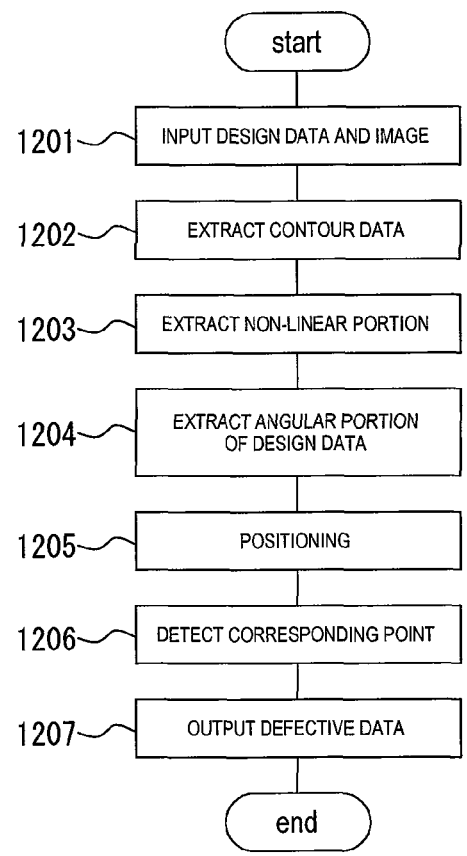
FIG. 12 is a flow chart explaining a pattern inspection procedure in a pattern inspection apparatus of the present invention.

As explained above, the pattern inspection apparatus 100 of the present invention performs comparison between the angular part 112 of design data 111 such as a line end and a corner and the position of the non-linear part 110 extracted from the image 108 of the circuit pattern to thereby detect the defect 113 on the wafer. FIG. 12 is a flow chart explaining a defect detection procedure by the pattern inspection apparatus 100. In step S1201, an image in which a circuit pattern to be inspected is captured and design data of the circuit pattern are inputted. In step S1202, the contour extraction section extracts contour data of the circuit pattern from the image. Then, in step S1203, the non-linear part detection section extracts a non-linear part of contour data. Moreover, in step S1204, the angular part extraction section extracts vertex coordinate information as an angular part of the pattern from the design data. Next, the pattern position of design data and that of contour data are adjusted in step S1205, and the position of the angular part extracted from the design data is compared with the position of the non-linear part of the contour data extracted from the image so as to search out each corresponding point in step S1206. In step S1207, a part where no corresponding point is detected as a defective position is outputted to the data storage section.

Figure 2:
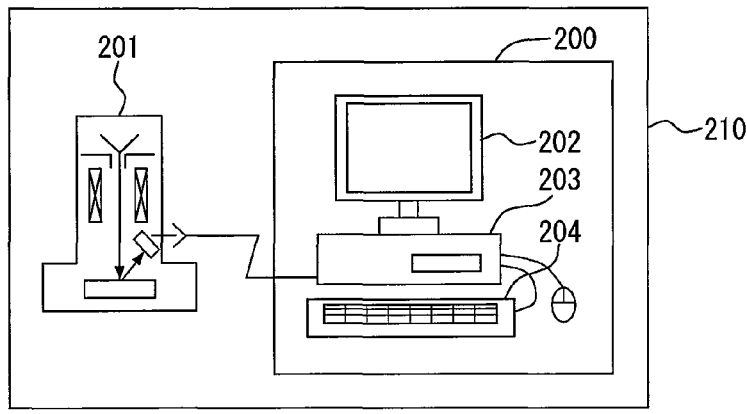
FIGS. 2A and 2B are views each showing a configuration of a semiconductor inspection apparatus to which a pattern inspection apparatus of the present invention is applied.
Figure 2:
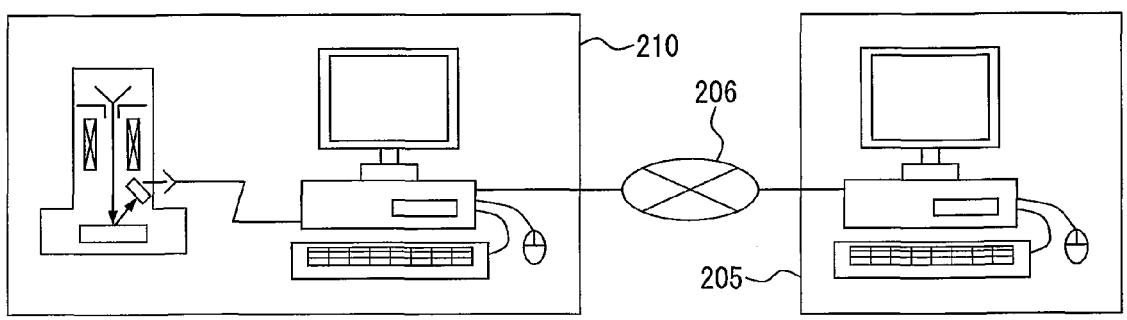
Figure 13:
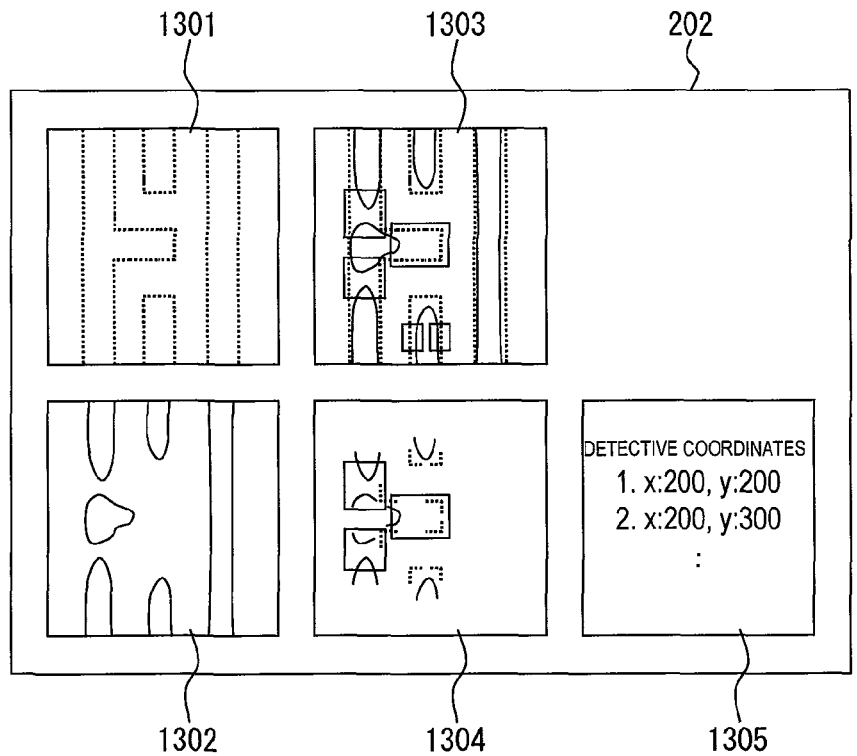
FIG. 13 is a view showing a window that displays a pattern inspection result in a pattern inspection apparatus of the present invention.

The defect detected by the above-explained procedure can be displayed on the display section 202 of the computer 200 shown in FIG. 2 through a window display program. A display example is shown in FIG. 13. In the window, design data 1301, an image 1302 in which a circuit pattern to be inspected is captured, a defective part 1303, defective coordinate information 1305, an angular part of design data used in defect detection, and a non-linear part 1304 of contour data extracted from the image are displayed. Such information is displayed, whereby it is possible to provide the operator with information of the defect of the circuit pattern included in the image.

Figure 9:
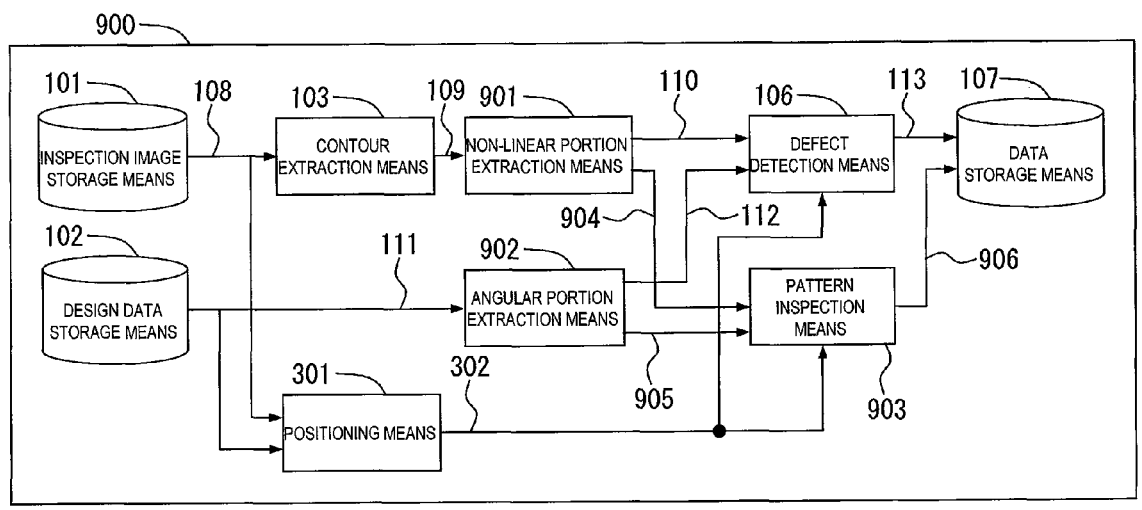
FIG. 9 is a block diagram showing a configuration of a pattern inspection apparatus according to a second embodiment of the present invention.

FIG. 9 is a block diagram showing a configuration of a pattern inspection apparatus according to a second embodiment of the present invention. A pattern inspection apparatus 900 is provided with a pattern inspection section 903 that inspects a linear part of a pattern included in the image 108 in addition to the configuration of the pattern inspection apparatus 300 explained in the first embodiment, and allows inspection of a pattern line width and a pattern length except the defects as explained in the first embodiment. The following will explain the details on only the elements different from those of the pattern inspection apparatus 300 of the first embodiment.

Figure 10:
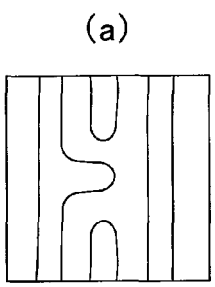
FIG. 10 is a view showing data obtained by separating contour data extracted from an image into a non-linear part and a linear part and extracting them.
Figure 10:
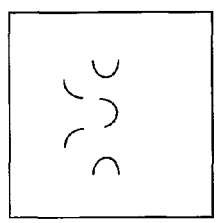
Figure 10:
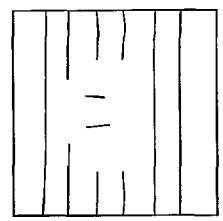
Figure 10:
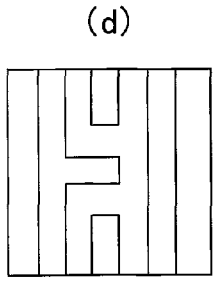
Figure 10:
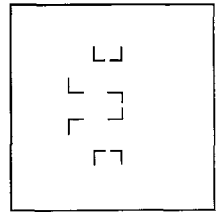
Figure 10:
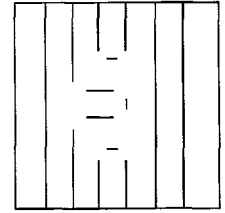

A non-linear part extraction section 901 separates and extracts a non-linear part 100 and a linear part 904 from contour data 109. An example is shown in FIG. 10. FIG. 10A is contour data, 10B is data indicating a non-linear part, and FIG. 10C is data indicating a linear part. Likewise, an angular part extraction section 902 separates and extracts an angular part 112 and a non-angular part 905 from design data 111. An example is shown in FIG. 10. FIG. 10D is design data, 10E is data indicating an angular part, and FIG. 10F is data indicating a non-angular part. The defect detection section 106 performs defect detection shown in the first embodiment, and the pattern inspection section 903 inspects a pattern length and a line width of the linear pattern, by using the linear part 904 extracted by the non-linear part extraction section 901 and the non-angular part 905 extracted by the angular part extraction section 902. Such a pattern inspection has been conventionally executed by using the semiconductor inspection apparatus such as a CD-SEM and the like, and the inspection method is not limited to this method.

As explained above, the pattern inspection apparatus 900 of the present invention can achieve the detection of defects such as cutting and short-circuit of the pattern in addition to the pattern inspection such as the line width and the pattern length. Accordingly, by applying this invention, for example, to the CD-SEM apparatus that measures the line width of a pattern, it becomes possible not only to measure the line width of the pattern but also to detect the defect of the pattern included in the image.

As explained above, the pattern inspection apparatus of the present invention can be mounted on, for example, a scanning electron microscope system, and is capable of detecting defects on a circuit pattern by: extracting a non-linear part of a pattern from a captured image of a circuit pattern on a wafer; extracting an angular part of a pattern such as a line end and a corner from design data of the circuit pattern, and performs comparison between the position of the non-linear part and that of the angular part; and then detecting the presence or absence of a corresponding point.

What is claimed is:

1. A pattern inspection apparatus comprising a data calculation device configured to inspect a semiconductor device, based on a comparison of a captured image with design data, the data calculation device configured to perform the machine-implemented steps of:
   extracting a non-linear portion from contour data extracted from the captured image of the semiconductor device;
   extracting an angular portion of a pattern from the design data of the semiconductor device;
   matching the non-linear portion extracted from the contour data with the angular portion of the pattern extracted from the design data, and
   detecting the non-linear portion not matched with the angular portion of the pattern extracted from the design data.

2. The pattern inspection apparatus according to claim 1, wherein the data calculation device determines, as defective parts, a non-linear part having no positionally corresponding angular part and an angular part having no positionally corresponding non-linear part.

3. The pattern inspection apparatus according to claim 1, wherein the data calculation device detects a direction of a pattern from a convex direction of the non-linear portion, detects a direction of a pattern from an angular direction of the angular portion, and detects a defective position of the pattern by comparing a position of the non-linear portion with a position of the angular portion, and by comparing the direction of the pattern detected from the non-linear portion with the direction of the pattern detected from the angular portion.

4. The pattern inspection apparatus according to claim 3, wherein the data calculation device determines, as defective parts, a non-linear part having no positionally corresponding angular part, and an angular part having no positionally corresponding non-linear part, and determines, as defective parts, a non-linear part and an angular part positionally corresponding to each other but being different from each other in the detected direction of the pattern.

5. The pattern inspection apparatus according to claim 1, further comprising a data storage section for storing, in a distinguishable format, data of the non-linear portion extracted by the data calculation device and data of a linear part obtained by excluding the non-linear portion from the contour data, wherein
   the data calculation device detects a defective position of a pattern by using data of the non-linear portion stored in the data storage section.

6. The pattern inspection apparatus according to claim 5, further comprising an inspection section for inspecting a pattern width and a pattern length of a linear pattern by using data of the linear part stored in the data storage section.

7. The pattern inspection apparatus according to claim 1, further comprising a display section for displaying a captured image of the semiconductor device to be inspected, design data and position information of a defective part.

8. A semiconductor inspection system comprising:
   a scanning electron microscope;
   a computer, including a data calculation device configured to inspect a semiconductor device, based on a comparison of a captured image with design data, the data calculation device configured to perform the machine-implemented steps of:
   extracting a non-linear portion from contour data extracted from the captured image of the semiconductor device;
   extracting an angular portion of a pattern from the design data of the semiconductor device;
   matching the non-linear portion extracted from the contour data with the angular portion of the pattern extracted from the design data; and
   detecting the non-linear portion not matched with the angular portion of the pattern extracted from the design data; and
   a software program for controlling the scanning electron microscope.

9. The semiconductor inspection system according to claim 8, wherein the computer receives the image of the semiconductor device captured by the scanning electron microscope and the design data via a network or an external connection type memory.

10. The semiconductor inspection system according to claim 8, wherein, in the detecting step, a non-linear part having no positionally corresponding angular part and an angular part having no positionally corresponding non-linear part are determined as defective parts.

11. The semiconductor inspection system according to claim 8, wherein, in the detecting step, a direction of a pattern is detected from a convex direction of the non-linear part, a direction of a pattern is detected from an angular direction of the angular part, a defective position of the pattern is detected by comparing a position of the non-linear part with a position of the angular part, and by comparing the direction of the pattern detected from the non-linear part with the direction of the pattern detected from the angular part.

12. The semiconductor inspection system according to claim 8, wherein in the detecting step, a non-linear part, having no positionally corresponding angular part, and an angular part, having no positionally corresponding non-linear part, are determined as defective parts, and a non-linear part and an angular part, positionally corresponding to each other but being different from each other in the detected direction of the pattern, are determined as defective parts.

13. The semiconductor inspection system according to claim 8,
   wherein the computer comprises a data storage section, and further executes a data storage step of storing, in the data storage section, data of the non-linear portion extracted by the data calculation device and data of a linear part, where the non-linear portion is excluded from the contour data, in a distinguishable format, and
   wherein in the detecting step, a defective position of a pattern is detected using data of the non-linear portion stored in the data storage section.

14. The semiconductor inspection system according to claim 13, wherein the computer further executes an inspection step of inspecting a pattern width and a pattern length of a linear pattern using data of the linear part stored in the data storage section.

15. The semiconductor inspection system according to claim 8, further comprising a display section that displays a captured image of the semiconductor device to be inspected, design data, and position information of a defective part.

* * * * *